(12) United States Patent
Nishio et al.

(10) Patent No.: US 7,092,994 B2
(45) Date of Patent: Aug. 15, 2006

(54) SYSTEM, METHOD AND APPARATUS FOR UPDATING ELECTRONIC MAIL RECIPIENT LISTS

(75) Inventors: Takeshi Nishio, Sagamihara (JP); Akio Ogasawara, Fujisawa (JP); Toshio Yada, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/064,793

(22) Filed: Aug. 16, 2002

(65) Prior Publication Data

US 2003/0037114 A1    Feb. 20, 2003

(30) Foreign Application Priority Data

Aug. 16, 2001   (JP)   ............................... 2001-247393

(51) Int. Cl.
*G06F 15/16* (2006.01)
(52) U.S. Cl. .................. 709/206; 709/203; 709/207; 709/245; 715/501.1
(58) Field of Classification Search ................ 709/201, 709/203, 206, 207, 245
See application file for complete search history.

(56) References Cited

U.S. PATENT DOCUMENTS

| 6,405,243 B1 * | 6/2002 | Nielsen ...................... 709/206 |
| 2002/0052921 A1 * | 5/2002 | Morkel ...................... 709/206 |
| 2002/0103932 A1 * | 8/2002 | Bilbrey et al. .............. 709/245 |

* cited by examiner

*Primary Examiner*—Yves Dalencourt
(74) *Attorney, Agent, or Firm*—Marcia Doubet

(57) ABSTRACT

The e-mail system includes a responsible person terminal holding a plurality of recipient addresses to which given e-mail is sent, and a reference list editor terminal connected to the responsible person terminal through a network for editing a reference list comprising one or more recipient addresses to be updated from among the recipient addresses. The reference list includes recipient addresses to be replaced, recipient addresses to be deleted, and recipient addresses to be added. The reference list end a program or tool that references the reference list to update an e-mail recipient address list are recorded/stored on a server. The reference list editor terminal and the responsible person terminal access the server to cause the update function to be performed.

19 Claims, 11 Drawing Sheets

710 From: Shiro Tajima on 2001/04/06 17:47

To: Victor Vila/Ral/MBL, Winnie Poh/Ral/MBL, Tom Asahina/Ral/MBL, Tadashi Kurosawa/Jpn/MBL, Tomohisa Yoshizaki/Jpn/MBL, Rick Herrmann/Ral/MBL@MBLUS, Kazuhisa Sugane/Jpn/MBL@MBLJP, Yoshihiro 1

331 Saitoh/Jpn/MBL@MBLUS, Akira Kamei/Jpn/MBL@MBLJP, Katsuji Honda/Jpn/MBL@MBLJP, Margarin Daly/Ral/MBL@MBLUS, Tomohisa Iwami/Jpn/MBL@MBLJP, Mitsuo Asahara/Jpn/MBL@MBLJP, Yoshihiro Sakaue/Jpn/MBL@MBLJP, Masato Yashiro/Jpn/MBL@MBLJP, Shoichi Yokota/Jpn/MBL@MBLJP, Yohichi Kanda/Jpn/MBL@MBLJP, Arihisa Naitoh/Jpn/MBL@MBLJP, Tadashi Inui/Jpn/MBL@MBLJP, Hisashi Hanabusa/Jpn/MBL@MBLJP, Toshiji Saitoh/Jpn/MBL@MBLJP, Nobuaki 2 Saitoh/Jpn/MBL@MBLJP, Masashi 2 Kobayashi/Jpn/MBL@MBLJP, Reiko Kataoka/Jpn/MBL@MBLJP, Yuhji 2 Shiraishi/Jpn/MBL@MBLJP, Yukihiko Nakazawa/Jpn/MBL@MBLJP, Hirohisa Makimura/Jpn/MBL@MBLJP, Kenzoh Yonemochi/Jpn/MBL@MBLJP 720 cc:

730 From: Shiro Tajima/Japan/MBL@MBLJP

Subject: Kobe-3 Weekly Status Update -04/06/01

710 From: Shiro Tajima on 2001/04/06 17:47

To: Stephon Murphy/Ral/MBL,Lian Davidson/Ral/MBL,Tommy Wong/Ral/MBL,Toshiyuki Takayama/Jpn/MBL,
331' Masaki Ohnishi/Jpn/MBL,Masato Yashiro/Jpn/MBL@MBLJP,Shoichi Yokota/Jpn/MBL@MBLJP,Yohichi
Kanda/Jpn/MBL@MBLJP,Arihisa Naitoh/Jpn/MBL@MBLJP,Tadashi Inui/Jpn/MBL@MBLJP,Hisashi
Hanabusa/Jpn/MBL@MBLJP,Toshiji Saitoh/Jpn/MBL@MBLJP,Nobuaki 2 Saitoh/Jpn/MBL@MBLJP,Masashi 2
Kobayashi/Jpn/MBL@MBLJP,Reiko Kataoka/Jpn/MBL@MBLJP,Yukji 2 Shiraishi/Jpn/MBL@MBLJP,Yukihiko
Nakazawa/Jpn/MBL@MBLJP,Hirohisa Makimura/Jpn/MBL@MBLJP,Kenzoh Yonemochi/Jpn/MBL@MBLJP,
Vicent R Rios/Ral/MBL@MBLUS,Nobuo Tsurukawa/Jpn/MBL@MBLJP,Luise Mull/Ral/MBL@MBLUS,Darry
Cromer/Ral/MBL@MBLUS,Pete Rasmussen/GB/MBL@MBLGB,Toshiro Yada/Jpn/MBL@MBLJP 720 cc:

730 From: Shiro Tajima/Japan/MBL@MBLJP

Subject. Kobe-3 Weekly Status Update -04/06/01

SYSTEM, METHOD AND APPARATUS FOR UPDATING ELECTRONIC MAIL RECIPIENT LISTS

FIELD OF THE INVENTION

The present invention relates to an e-mail system, and in particular, to a technology for efficiently updating lists of recipients to which e-mail is delivered.

BACKGROUND OF THE INVENTION

Communication by e-mail has become increasingly important with the growth of the Internet and other communication networks and the widespread use of information terminals, including personal computers. As a result, e-mail systems continue to become an important social infrastructure, and not simply a business tool.

E-mail is used as the above-mentioned business tool as well as for personal use. Therefore, an e-mail user may often send e-mail containing the same contents to a number of recipients. In addition, it is commonplace that a user sends e-mail to a number of recipients on a regular basis. There exists a common usage pattern in which certain e-mail is distributed (broadcasted) to a number of fixed recipients on a regular basis.

In order to support such a usage pattern, the recipients of e-mail are often grouped. That is, the e-mail user groups and registers a plurality of e-mail addresses into a list and can then select the listed group as the recipient of the e-mail, thereby eliminating the need to select the plurality of e-mail addresses individually.

The e-mail addresses grouped and registered by the e-mail user into a list can change. A specific example of this will be described with respect to usage of e-mail in a company. For example, a certain employee may utilize e-mail to report the progress of his/her activity in a certain time period to a plurality of other employees. The employee who reports the progress is called the "sender" and the employees who receive the report are called "recipients" herein. Personnel changes, including changes in responsibility, may occur quite often in the company. Therefore, the intended recipients may change according to the personnel changes. Because information about the personnel changes is typically provided to the employees of the company, the sender can know the information on his/her own to individually change the e-mail addresses registered by him/her.

However, it is not necessarily easy for the sender to know all the personnel changes without fail. It is especially difficult if the scale of the company is large because the number of the recipients may be as large as several hundred. As a result, employees who should no longer receive an e-mail message may receive it or employees who should receive the e-mail message may not receive it. If this occurs, quick business activities using information technology would not be ensured. Furthermore, even if the sender knows all the personal changes, the large number of recipients may burden the sender with update tasks such as the addition and deletion of the recipients. For example, every member of a project team in a company can be a sender. In that case, each individual sender updates e-mail addresses. Such update tasks are undesirable for the efficiency of business activities in the company.

The e-mail addresses update tasks described above with respect to in-company e-mail by way of example are not limited to a company. They can generally occur in anywhere e-mail is used.

Therefore, it is an object of the present invention to provide an e-mail system capable of reducing the burden of updating a list of e-mail addresses. It is another object of the present invention to provide a method of updating an e-mail recipient address list that allows such updates. It is yet another object of the present invention to provide a computer apparatus that is useful with respect to such an e-mail system and for performing the e-mail recipient address list updating method.

SUMMARY OF INVENTION

To attain these objects, the present invention provides an e-mail system configured as follows. The e-mail system includes: an e-mail transmitter holding a plurality of recipient addresses to which given e-mail is sent; and a terminal connected to the e-mail transmitter through a network for editing a reference list consisting of one or more recipient addresses to be updated from the recipient addresses and has an update function for updating the recipient addresses by referencing the reference list edited by the terminal.

The e-mail system according to the present invention includes an e-mail transmitter and a terminal for editing the reference list. For example, the e-mail transmitter may be implemented in a PC used by each member of the above-described project team within the company. The terminal for editing the reference list may be implemented, for example, in the PC of a reference list editor who is in charge of personnel changes in each division and familiar with personnel information and security, or in a mail server administrated by the reference list editor. That is, the e-mail system according to the present invention has a configuration in which a terminal dedicated to reference list editing is provided and the reference list edited on that terminal can be used to update recipient addresses held by the e-mail transmitter. This can save each member having an e-mail transmitter from having to individually update recipient address. Because the reference list consists of recipient addressees to be updated from recipient addresses held by the transmitter, the labor of updating the reference addresses individually can be saved. In addition, because the edit of the reference list on the terminal can be performed by the reference list editor, the edited information is highly accurate.

There are at least two forms of updates of the recipient addresses held by the e-mail transmitter in the e-mail system of the present invention. In one form, the e-mail transmitter includes the update function. In this case, the e-mail transmitter references a reference list edited on the reference list editor terminal. In the other form, a server is provided for performing the update function according to a request from the e-mail transmitter. In this case, the server obtains recipient addresses held by the e-mail transmitter according to a request from the e-mail transmitter and references the reference list held by the server to update the obtained recipient addresses. The server then provides the updated recipient addresses to the e-mail transmitter. The e-mail transmitter receives the updated recipient address and uses the recipient addresses to send a given e-mail.

The reference list in the e-mail system of the present invention may be implemented in at least three forms.

In one form, the reference list contains new recipient addresses to replace some of a plurality of recipient addresses held by the e-mail transmitter after an update. In this form, the e-mail transmitter replaces for example recipient address A specified as a recipient before the update with recipient address B based on a replacement list containing recipient addresses before the update and new recipient addresses.

In another form, the reference list contains recipient addresses to be deleted after an update. In this form, the e-mail transmitter deletes for example recipient address C specified as a recipient before the update based on a deletion list containing the recipient addresses to be deleted.

In yet another form, the reference list contains recipient addresses to be added after an update. In this form, the e-mail transmitter adds for example recipient address D which is not contained in a recipient address list before the update based on an addition list containing the recipient addresses to be added.

In order to solve the problems mentioned earlier, the present invention provides a method of updating a recipient address list consisting of a plurality of recipient addresses to which given information is sent, wherein a difference list consisting of addresses that are differences between a recipient address list before an update and a recipient address list after the update is obtained and the recipient address list before the update is updated by referencing the addresses contained in the difference list.

In the recipient address list updating method of the present invention, a list is obtained for updating addresses contained in a pre-update recipient address list to recipient addresses contained in a post-update recipient address list. This list contains addresses that are differences between the pre-update recipient address list and the post-update recipient address list. The pre-update recipient address list is updated based on the addresses contained in the difference list. Thus, the present invention enables the recipient address list to be updated by using the difference list, thereby saving individual users who send e-mail from having to update the addresses individually. In addition, because the recipient address list is updated based on the recipient addresses contained in the difference list, the accuracy of the updated recipient address list is increased.

In the recipient address list updating method of the present invention, the update of the recipient address list can be performed by referencing the difference list on a regular basis. For example, if a report concerning a development project is delivered weekly, the difference list can be referenced before the report is sent, thereby allowing the report to be sent always to recipient's addresses in which up-to-date personnel information is reflected. The update of the recipient address list can be performed in response to an indication of the difference list generation. The indication of the difference list generation may be displayed on application software that can open a database, when the server is accessed from a responsible person's terminal after a new difference list is generated on the server. Alternatively, the indication may be automatically provided by the server to the responsible person's terminal immediately after the difference list is generated.

The difference list may contain at least one of a list of addresses to be replaced that contains addresses before and after a replacement, a list of addresses to be deleted from, and a list of addresses to be added to the pre-updated recipient address list. The update of the recipient address list can include at least one of the replacement of the addresses to be replaced, the deletion of the addresses to be deleted, and the addition of the addresses to be added. In this way, the update of the recipient address list by using the difference list is accomplished by the replacement, deletion and addition.

Furthermore, in the recipient address list updating method of the present invention, the difference list obtained may be edited and addresses contained in the edited difference list may be referenced to update a first recipient address list.

The present invention provides the following computer apparatus for implementing the e-mail system or the recipient address list updating method as described above. The computer apparatus according to the present invention has the function of updating a recipient address list containing recipient addresses of given information and includes: a replacement module for replacing a recipient address(es) contained in the recipient address list with a different recipient address(es); a deletion module for deleting a given recipient address(es) from among the recipient addresses contained in the recipient address list; an addition module for adding a new recipient address(es) that is(are) not contained in the recipient address list to the recipient address list; a reference list storage for storing a reference list containing the different recipient address(es) to be replaced, the recipient address(es) to be deleted, and the new recipient address(es) to be added.

The computer apparatus according to the present invention performs the function of updating a recipient address list containing recipient addresses of a document such as a report delivered regularly. This function can be implemented by replacement means for replacing, for example, recipient address A with recipient address B, deletion means for deleting recipient address C from the recipient address list, addition means for adding recipient address D to the recipient address list, and a reference list. The reference list is stored in storage means such as a database of the computer apparatus. The burden of updating the recipient address list can be saved by a program or tool that references the reference list to update the recipient address list. In addition, the recipient address list can be accurately updated because the update is performed based on the reference list.

In the computer apparatus of the present invention, the reference list storage means can receive and store the reference list created on and input from another computer apparatus. That is, a reference list created in the computer apparatus itself can be stored in storage means such as a data base in the computer apparatus and,in addition, a reference is created on another computer can be input through a communication unit, for example, to it and recorded/stored in the database.

The computer apparatus of the present invention updates the recipient address list stored in the recipient address storage means by using at least one of the replacement means, deletion means, and addition means. Allowing the recipient address list in the computer apparatus to be stored in the computer apparatus in this way, the reference list can be referenced on one computer apparatus and the recipient address list can be updated by using the update function provided in that computer.

The computer apparatus of the present invention can also obtain a recipient address list stored on another computer apparatus. The computer apparatus of the present invention updates the obtained recipient address list by using at least one of the replacement means, deletion means, and addition means. Output means may be provided for outputting the updated recipient address list to another computer apparatus to obtain the recipient address list stored in a responsible person's terminal. In this configuration, for example a server can obtain a recipient address list stored on a responsible person's terminal through a communication module. Then, the server can reference a reference list to update the recipient address list by using the function provided in the server. In addition, the updated recipient address list can be output through a communication module to the responsible person's terminal.

The present invention can also provide a computer apparatus configured as described below for implementing the e-mail system or recipient address updating method described above. That is, the present invention provides a computer apparatus for updating a recipient address list containing recipients of given information, comprising a storage module for storing a difference list comprising addresses that are differences between a first recipient address list before an update and a second recipient address lit after the update; and a display module for displaying the difference list. The storage comprises a first storage for storing new recipient addressees replacing one of the recipient addresses contained in the recipient address list after the update, a second storage for storing recipient addresses to be deleted from among the recipient addresses contained in the recipient address list after the update, and a third storage for storing recipient addresses to be added to the list after the update.

The computer apparatus of the present invention allows a difference list to be stored in a database, for example. And this difference list can be edited by being displayed on a display unit or the like. The difference list consists of a replacement list, a deletion list, and an addition list. Each of these lists can be recorded/stored in the database, for example. Thus, using the difference list for updating a recipient address list can save the burden of updating the recipient address list. In addition, because the difference list is edited on a reference list editor terminal, the precision of the difference list is high. The high precision difference list can be applied to a plurality of recipient address lists and therefore inconsistency of recipient addresses caused by a human error can be prevented.

BRIEF DESCRIPTION OF DRAWINGS

Hereafter, the present invention will be described in detail in accordance with the embodiment(s) shown in the accompanying drawings, in which:

FIG. 7 shows a section of an e-mail screen according to the embodiment;

DETAILED DESCRIPTION

In the embodiment of the present invention shown in FIG. 1, it is assumed that the e-mail system is used for members (hereinafter called "responsible persons") involved in a predetermined development project in a company to report the progress of their development activities to each other on a regular basis by e-mail. The recipients of the reports are not limited to several responsible persons. Instead, the reports may be received also by a vast number of responsible persons involved in their development project activities. If a responsible person to whom the progress of the project should be reported is changed, for example, a responsible person is replaced with another person, a responsible person is discharged from the project, or a new responsible person joins the project by a personnel change, a responsible person sending the report by e-mail must update the e-mail address of the receiving responsible person.

Figure 1:
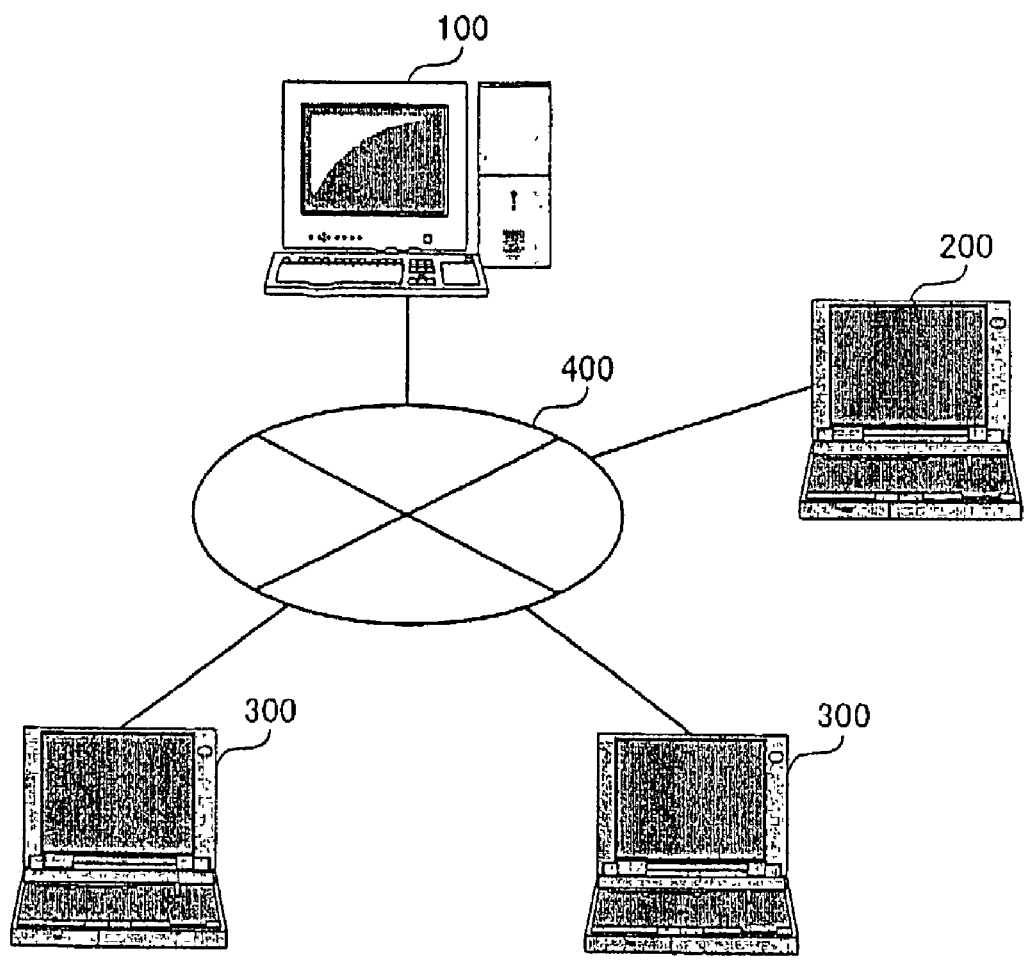
FIG. 1 shows a system configuration for updating an e-mail recipient address list according to an embodiment of the present invention.

As shown in FIG. 1, the e-mail system in this embodiment comprises a server 100 in which a reference list referenced in order to perform a recipient update, which will be described with respect to FIG. 2 (hereinafter simply called "reference list"), is recorded/stored, a reference list editor terminal 200 for managing e-mail addresses of recipients according to personnel changes, a responsible person terminal 300 to which e-mail such as a report is delivered on a regular basis, and a network 400 interconnecting these components. The server 100, reference list editor terminal 200, and responsible person terminal 300 can be implemented by a computer apparatus such as a PC (personal computer).

The responsible person terminal 300 is operated by a responsible person. Besides the responsible person terminal 300 shown, a large number of responsible person terminals 300 are connected through the network 400. A responsible person can communicate with the responsible person terminal 300 of another person involved in the development project by e-mail.

The responsible person terminal 300 is operated by a responsible person. Besides the responsible terminal 300 shown, a large number of responsible person terminals 300 are connected through the network 400. A responsible person can communicate with the responsible person terminal 300 of another person involved in the development project by e-mail.

An e-mail recipient address list is recorded/stored in the responsible person terminal 300. The responsible person terminal 300 sends e-mail about the progress of the development project to development project responsible persons on the e-mail recipient address list. The present embodiment updates the e-mail recipient address list for given e-mail accurately and efficiently.

The reference list editor terminal 200 can access a database of the server 100, and, if a particular responsible person (predecessor) is replaced with another responsible person (successor) by a personnel change, generate a list for replacing the e-mail address of the predecessor with that of the successor. If a particular responsible person is discharged from the development project by a personnel change, the reference list editor terminal 200 can generate a list for deleting the e-mail address of the person from the e-mail recipient address list. In addition, if a particular person joins the development project by a personnel change, the reference list editor terminal 200 can generate a list for adding the e-mail address of the person to the e-mail recipient address list. In this way, when a personnel change occurs, the reference list editor collects information about the personnel change and the reference list editor terminal 200 accesses the database of the server 100 to generate and edit the list described above and record and store it in the database of the server 100 as a reference list for updating the e-mail recipient address list. That is, the reference list in the present embodiment is used as a difference list that is referenced in order to update the e-mail recipient address list to a new e-mail recipient address list.

The responsible person terminal 300 can reference the reference list recorded/stored in the database of the server 100 to update the un-updated e-mail recipient address list recorded/stored in the responsible person terminal 300 and can record/store the new, updated e-mail recipient address list in the responsible person terminal 300.

In this way, the difference list on which information about a personnel change is entered by the reference list editor terminal 200 is recorded/stored in the database of the server 100, thereby allowing the reference list to be centralized and managed in the database of the server 100. In addition, each responsible person terminal 300 references the reference list as a difference list for updating an e-mail recipient address list recorded/stored in each responsible person terminal 300, thereby allowing the e-mail recipient address list to be decentralized and managed.

Figure 2:
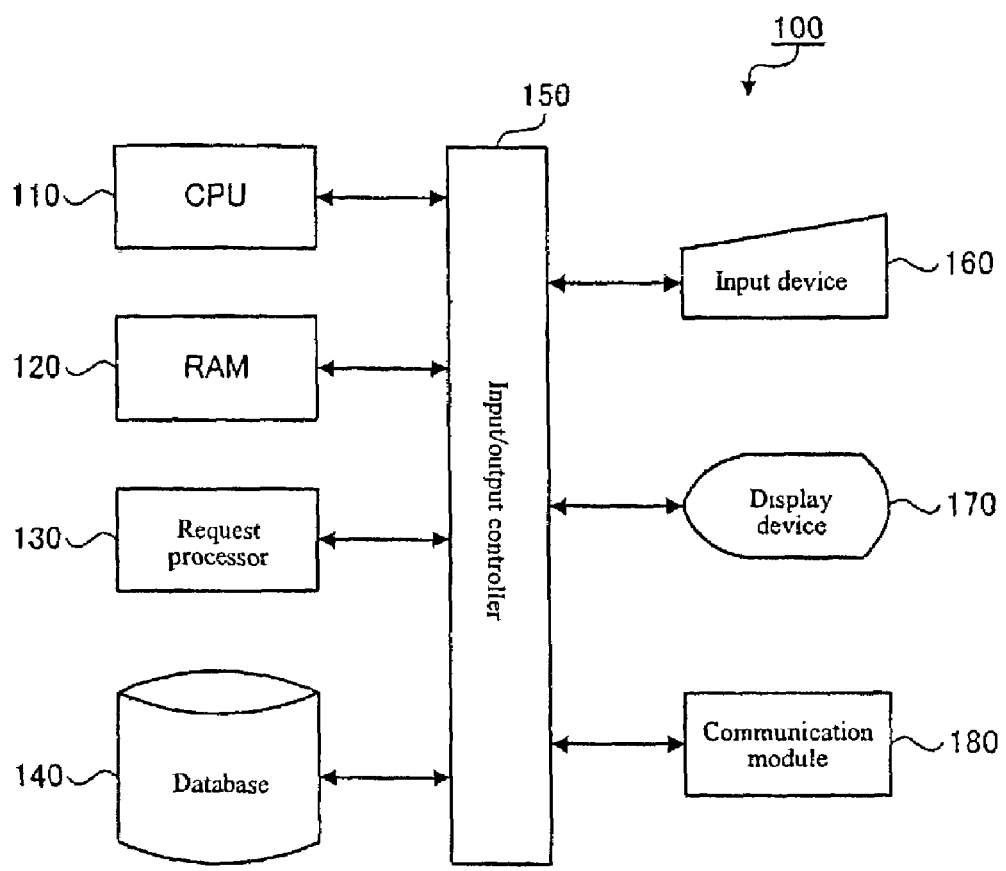
FIG. 2 shows a configuration of a server for recording/storing a reference list according to the embodiment.

As shown in FIG. 2, the server 100 for recording/storing the reference list in the present embodiment comprises a CPU 110 for controlling the operation of the server 100 according to an OS (Operating System, not shown) and a control program (not shown) loaded in RAM 120, a request processor 130 including a program or tool for editing the reference list according to a request from the reference list editor terminal 200 and the responsible person terminal 300 and updating an e-mail recipient address list to a new e-mail recipient address list based on the reference list, a database 140 for recording/storing the reference list, an input device 160, including, for example, a keyboard and/or a mouse, a display device 170, including a display, a communication module 180 for communicating with other devices through a network 400, and an input/output controller 150 interconnecting these components.

Figure 5:
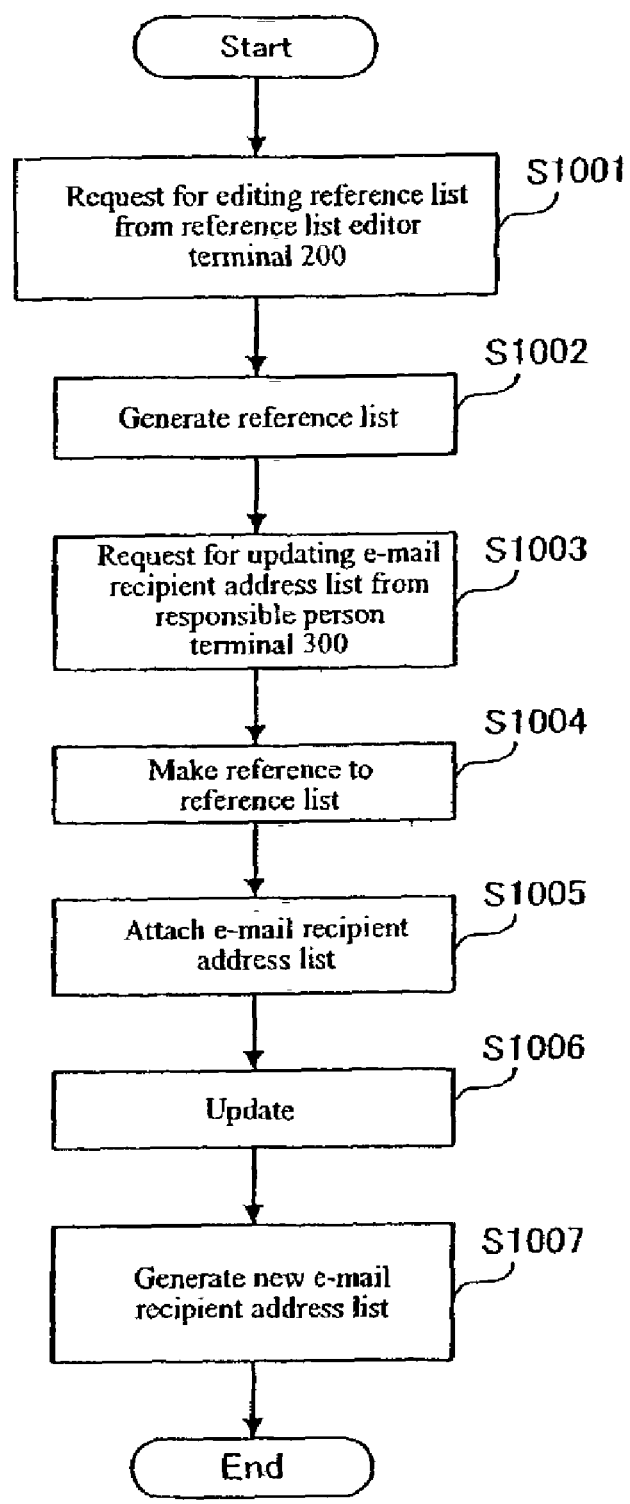
FIG. 5 is a flowchart for illustrating a process flow according to the embodiment.

As described above, the reference list, which will be detailed later with respect to FIG. 5, is recorded/stored in the database 140 of the server 100. Recorded on the reference list are a list of the e-mail addresses of particular predecessors and a list of the e-mail address of their successors. Also recorded on the reference list are a deletion list containing the e-mail address(es) of responsible person(s) to be deleted from an e-mail recipient address list and an addition list containing the e-mail address(es) of responsible person(s) to be added to the e-mail recipient address list.

When a personnel change occurs, a reference list editor who is in charge of personnel changes in the company organization can obtain information about the personnel change. The reference list editor issues a request from the reference list editor terminal 200 to the server 100 for editing a new reference list. The request for editing the reference list sent from the reference list editor terminal 200 is received by the communication module 180 capable of transmitting and receiving data through the network 400. The edit request is then provided to the request processor 130 through the input/output controller 150. The request processor 130 performs a process for editing the reference list according to the edit request and records/stores the reference list edited by the process in the database 140.

The request processor 130 can read and reference the reference list according to an update request sent from a responsible person terminal 300 through the communication module 180 and update the e-mail recipient address list. The communication module 180 receives the e-mail recipient address list sent during the update request and sends it to the request processor 130. The communication module 180 sends the new e-mail recipient address list updated in the request processor 130 to the responsible person terminal 300.

Figure 3:
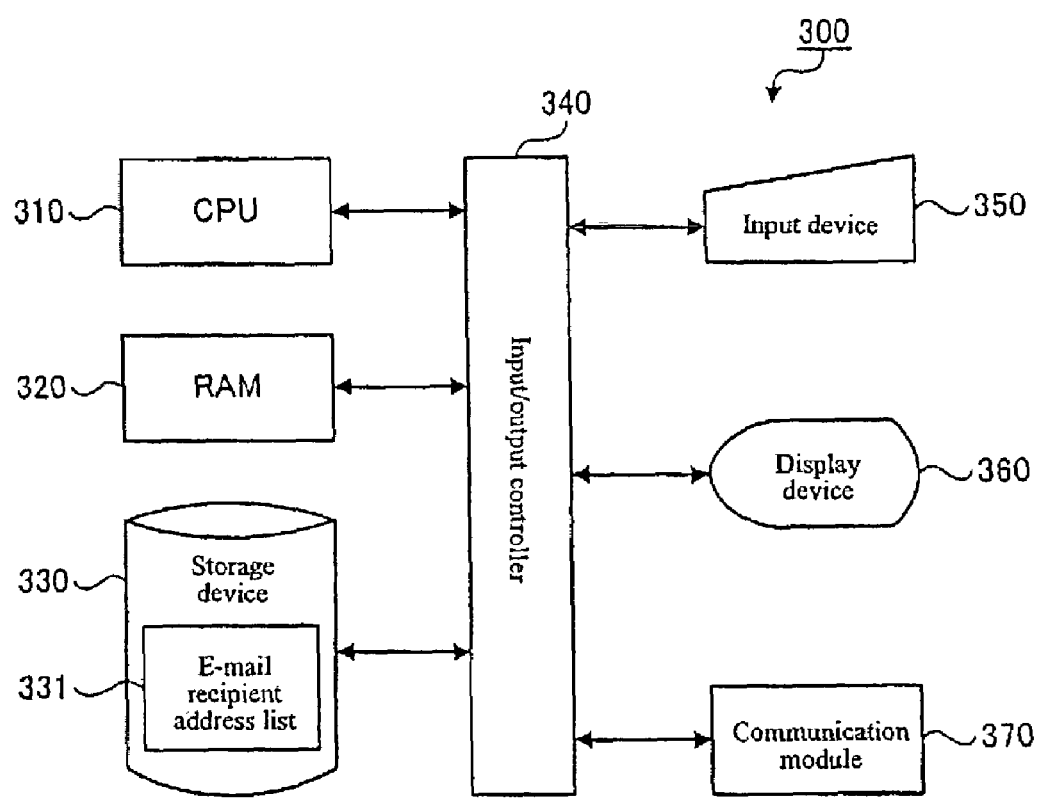
FIG. 3 shows a configuration of a responsible person terminal for updating the e-mail recipient address list according to the embodiment.

Referring now to FIG. 3, the responsible person terminal 300 that sends e-mail based on an e-mail recipient address list in the present embodiment comprises a CPU 310 for controlling the operation of the responsible person terminal 300 according to an OS not shown) and a program (not shown) loaded in RAM 320, a storage device 330 for recording/storing an e-mall recipient address list 331, an input device 350, including, for example, a keyboard and/or a mouse, a display device 360, including a display, a communication module 370 for communicating with other devices through a network 400, and an input/output controller 340 interconnecting these components.

This responsible person terminal 300 is operated by each person involved in the development project and regularly sends a report to the terminals 300 of other responsible persons involved in the project concerned by e-mail. When e-mail is sent in this way, the responsible person terminal 300 can access the server 100 to determine whether any personnel change(s) has occurred. While it is assumed herein that the determination is made when sending e-mail, the responsible person terminal 300 may access the server 100 on a regular basis independently of the transmission of the e-mail. If a personnel change has occurred, a new reference list has been generated with the personnel change, and the new reference list has been recorded/stored in the database 140 of the server 100 and an indication of this fact may be displayed on the display device 360 of the responsible person terminal 300. The responsible person terminal 300, which receives the indication, sends a request for updating the e-mail recipient address list 331 to the server 100. In response to a request sent to the server 100, which will be detailed later, the server 100 can reference the reference list recorded/stored in the database 140 to update the e-mail recipient address list 331 recorded/stored in the storage device.

The responsible person terminal 300 can obtain and duplicate the reference list recorded/stored in the database 140 of the server 100 to edit it in the responsible person terminal 300. Each responsible person terminal 300 can also generate a private reference list that consists of a replacement list, a deletion list, and addition list for each responsible person and record/store it in the storage device 330. The responsible person terminal 300 can then update the e-mail recipient address list 331 based on the private reference list generated.

While in the present embodiment the responsible person terminal 300 accesses the server 100 to send e-mail regularly and the e-mail recipient address list 331 is updated, the reference list editor terminal 200 may inform the responsible person terminal 300 of a change to the reference list by e-mail when the change is made in the server 100. In addition, when the reference list in the server 100 is changed, the e-mail recipient address list 331 in the responsible person terminal 300 may be automatically updated to synchronize it with the reference list.

While the present embodiment is described based on the assumption that the function of updating the e-mail recipient address list 331 is implemented by the request processor 130 in the server 100, it is not necessarily required that the function itself is included in the server 100. Instead, the responsible person terminal 300 may operate to access the database 140 of the server 100 and obtain the reference list.

The function of updating an e-mail recipient address list 331 will be described below with reference to FIG. 4. The e-mail recipient address list updating function comprises a replacement function 510 for replacing an e-mail address on an e-mail recipient address list 331, a deletion function 520 for deleting a particular e-mail address from among e-mail addresses on the e-mail recipient address list 331, an addition function 530 for adding a given e-mail address to the e-mail recipient address list 331, and a duplicate recipient deletion function 540 for deleting a duplicate e-mail address from among the e-mail addresses on the e-mail recipient address list 331.

The replacement function 510 replaces the e-mail address of a predecessor with the successor in the electronic e-mail addresses on the e-mail recipient address list 331. That is, this function replaces e-mail addresses on a pre-replacement list recorded on the reference list stored in the database 140 of the server 100 with e-mail addresses on a post-replacement list one by one. Thus, the replacement function 510 allows the e-mail address of a responsible person of a particular rank to be updated without changing the order of the addresses on the e-mail recipient address list 331. This function also allows e-mail addresses on a replacement list to be automatically replaced at a time without the need for manually searching the e-mail recipient address list 331 for the e-mail addresses to be replaced one by one.

The deletion function 520 deletes from the e-mail recipient address list 331 an e-mail address on a deletion list from among e-mail addresses on the reference list recorded/stored in the database 140 of the server 100. Thus, the deletion function 520 allows e-mail addresses on the deletion list to be automatically deleted at a time without having to manually search the e-mail recipient address list 331 for the e-mail addresses to be deleted one by one.

The addition function 530 adds an e-mail address on an addition list in the reference list recorded/stored in the database 140 of the server to the e-mail recipient address list 331. The e-mail address added by the addition function 530 is appended to the e-mail recipient address list 331.

E-mail addresses that are manually entered into the e-mail recipient address list 331 without using these functions may overlap e-mail addresses replaced or added by the replacement function 510 or addition function 520. However, the overlapped e-mail addresses can be deleted by using the duplicate recipient deletion function 540.

Deleting overlapped e-mail addresses after the replacement, deletion, or addition of e-mail addresses on the e-mail recipient address list 331 in this way allows the e-mail recipient address list 331 to be updated automatically and efficiently to broadcast e-mail to responsible person terminals 300 to which the e-mail addresses on the updated e-mail recipient address list 331 are to be sent.

In this embodiment it is assumed that the recipients of e-mail addresses are recorded/stored as an e-mail recipient address list 331 containing individual e-mail addresses, rather than being grouped and recorded/stored. The e-mail recipient address list 337 is pasted to e-mail and sent. This allows the recipients of the e-mail through broadcasting to know to whom the e-mail is broadcasted.

While the present embodiment will be described based on the assumption that the e-mail recipient address list 331 containing individual e-mail addresses is recorded/stored, an e-mail recipient address list on which recipients are grouped and recorded/stored can be updated by using the same method.

Operational procedures of a method according to the present embodiment will be further detailed with reference to FIGS. 5 to 10. Referring now to FIG. 5, a personnel change occurs in an organization of a company. In order to inform responsible persons of the personnel change, a reference list editor makes a request from the reference list editor terminal 200 to the server 100 to update a reference list for updating an e-mail recipient address list 331 (step 1001). The server 100 receives the edit request and causes the display device of the reference list editor terminal 200 to display a screen for editing the reference list, which will be described later with reference to FIG. 6, to edit the reference list (step 1002), then records/stores it in the database 140.

Each responsible person involved in the development project uses each responsible person terminal 300 to access the server 100 to determine whether there is a reference list for the e-mail recipient address list 331 (step 1003), in order to report his/her activities regularly. If there is a reference list, he/she references the list, which is recorded/stored in the database 140 of the server 100 (step 1004). At the time of referencing the reference list, the person can display it on the display device 360 of the responsible person terminal 300 to visually identify changed personnel. The responsible person terminal 300 pastes the e-mail recipient address list 331 which has not yet been updated to a predetermined position of a screen displayed on the display device 360 (step 1005), which will be described later with respect to FIG. 9. Then a predetermined operation is performed to update the e-mail recipient address list 331 (step 1006). The update is performed by the update function of the server 100 shown in FIG. 4. After the completion of the update, the e-mail recipient address list 331 becomes a new e-mail recipient address list as shown in FIG. 10 (step 1007). The responsible person terminal 300 can use the new e-mail recipient address list displayed on the display device 360 to make reports regularly.

The update of the e-mail recipient address list can be performed not only on the server 100 but also on the responsible person terminal 300 obtaining and duplicating the reference list recorded/store in the database 140 of the server 100 as described above.

Figure 6:
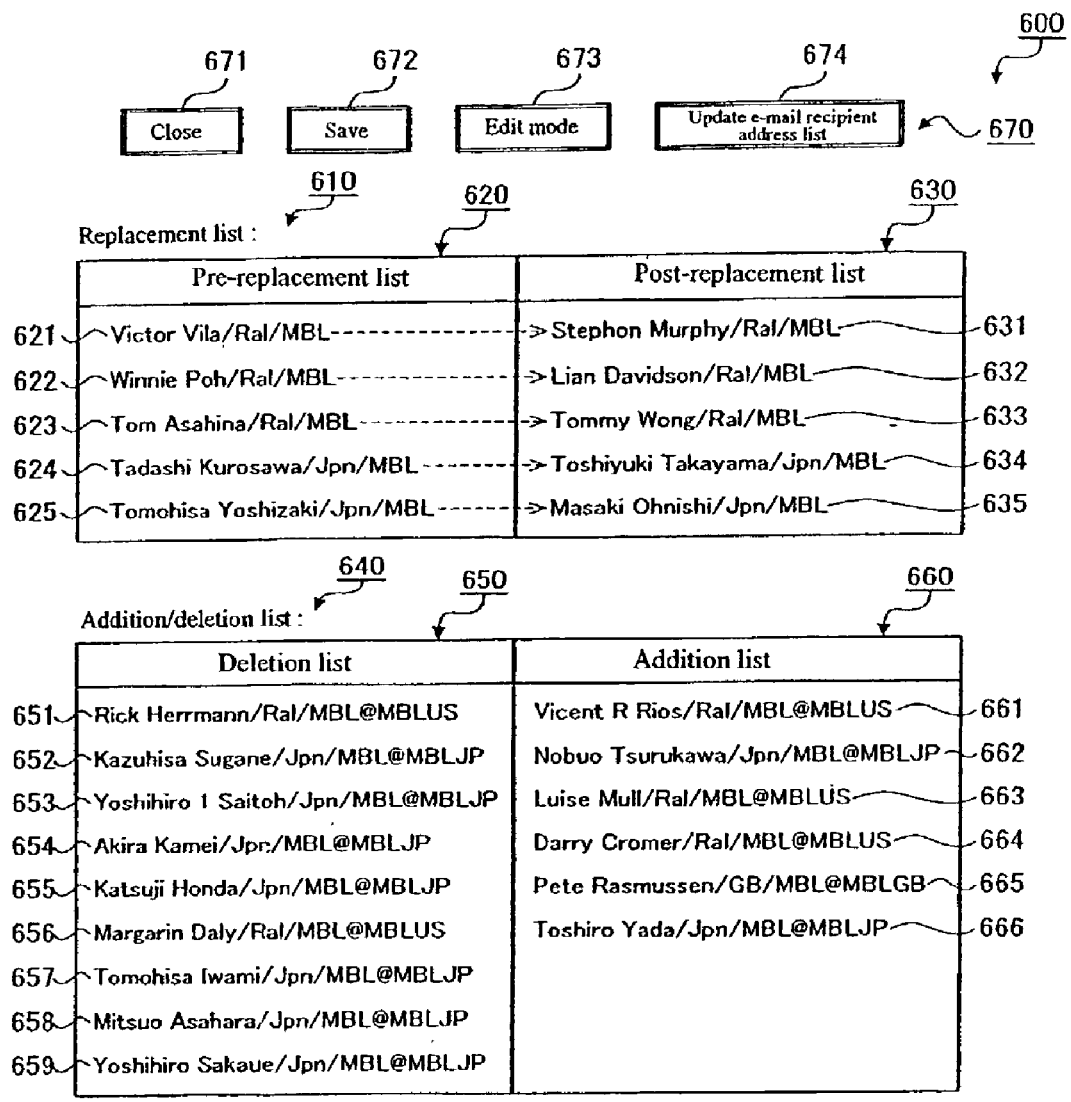
FIG. 6 shows an example of a screen for editing the reference list according to the embodiment.

When a reference list editor accesses the server 100 from the reference list editor terminal 200 and performs an operation for updating a reference list, a reference list creation screen 600 is displayed, as shown in FIG. 6. The reference list creation screen 600 includes a replacement list 610 consisting of a pre-replacement list section 620 and a post-replacement section 630, and an addition/deletion list 640 consisting of a deletion list section 650 and an addition list section 660. It also contains a set of buttons 670 including a "Close" button 671, "Save" button 672, "Edit mode" button 673, and "Update recipient address list" button 674.

The pre-replacement list section 620 contains the e-mail addresses 621–625 of predecessors shifted to another position. The post-replacement list section 630 contains the e-mail addresses 631–635 of their successors who became new responsible persons in place of the predecessor. The deletion list section 650 contains the e-mail addresses 651–659 of responsible persons to be deleted from the e-mail recipient address list 331. The addition list section 660 contains the e-mail addresses 661–666 of persons to be added to the e-mail recipient address list 331.

The "Close" button 671 is a button for closing the reference list creation screen 600. The "Save" button 672 is for saving the state of the lists contained in the reference list creation screen 600. Clicking on the "Close" button without clicking on the "Save" button displays a pop up message prompting for a save. The "Edit mode" button 673 is a button for enabling each list to be edited. The "Update recipient address list" button 674 is a button for displaying a screen, which will be described later with respect to FIG. 9, for updating the e-mail recipient address list 331 by the responsible person terminal 300.

E-mail addresses contained in the e-mail recipient address list 331 can be changed from e-mail addresses entered in the pre-replacement list section 620 of the replacement list 610 to e-mail addresses entered in the post-replacement list section 630. That is, e-mail address 621 can be replaced with e-mail address 631, e-mail address 622 can be replaced with e-mail address 632, e-mail address 623 can be replaced with e-mail address 633, e-mail address 624 can be replaced with e-mail address 634, and e-mail address 625 can be replaced with e-mail address 635.

E-mail addresses 651–659 contained in the deletion list section 650 can be deleted from the lists of e-mail addresses on the e-mail recipient address list 331.

E-mail addresses 661–666 contained in the addition list section 660 can be added to the e-mail recipient address list 331. The e-mail addresses 661–666 contained in the addition list section 660 are appended to the e-mail recipient address list 331.

It is verified that correct e-mail addresses are entered in each of the pre-replacement list section 620, post-replacement list section 630, deletion list section 650, and addition list section 660, then the "Update recipient address list" button 674 is clicked. Then the reference list is edited on the reference list editor terminal 200 based on the e-mail addresses entered in the reference list creation screen 600.

The reference list is recorded/stored in the database 140 of the server 100.

It is assumed in this embodiment that the following constraints are applied to the edit of the reference list.

If e-mail addresses on the e-mail recipient address list 331 before being updated contain character strings, such as "@MBLUS" or "@MBLJP", then the e-mail addresses in the deletion list section 650 should contain the same character strings. If the e-mail addresses on the e-mail recipient address list 331 before updated do not contain the character strings, such as "@MBLUS" or "@MBLJP", the e-mail addresses in the pre-replacement list section 620 should not contain these strings. If the e-mail addresses in the pre-replacement list section 620 do not contain the character strings such as "@MBLUS" or "@MBLJP", the e-mail addresses in the post-replacement list section 630 should not contain these character strings.

No space character should be used as a separator between e-mail addresses on these lists. Instead, a new-line character or comma should be used. The new-line character and comma should not be used for other purposes than the separator between e-mail addresses.

Rich text format files cannot be pasted to these lists, therefore text format lists should be pasted to these lists.

Character strings entered in or pasted to these lists are case-sensitive.

As shown in FIG. 7, the section 700 of the e-mail screen on the responsible person terminal 300 consists of an e-mail recipient list field 710, sender field 720, and subject field 730.

An e-mail recipient address list 331 is displayed in the e-mail recipient field 710. In practice more e-mail addresses of recipients to whom the e-mail is broadcasted than those shown in FIG. 7 would be displayed. The e-mail address of the responsible person terminal 300 that sends the e-mail is displayed in the sender field 720. The subject of the e-mail is displayed in the subject field 730.

The recipient address list displayed in the e-mail recipient list field 710, which is to be updated, is selected on the responsible person terminal 300 and copied to the clipboard of the terminal 300.

Figure 8:
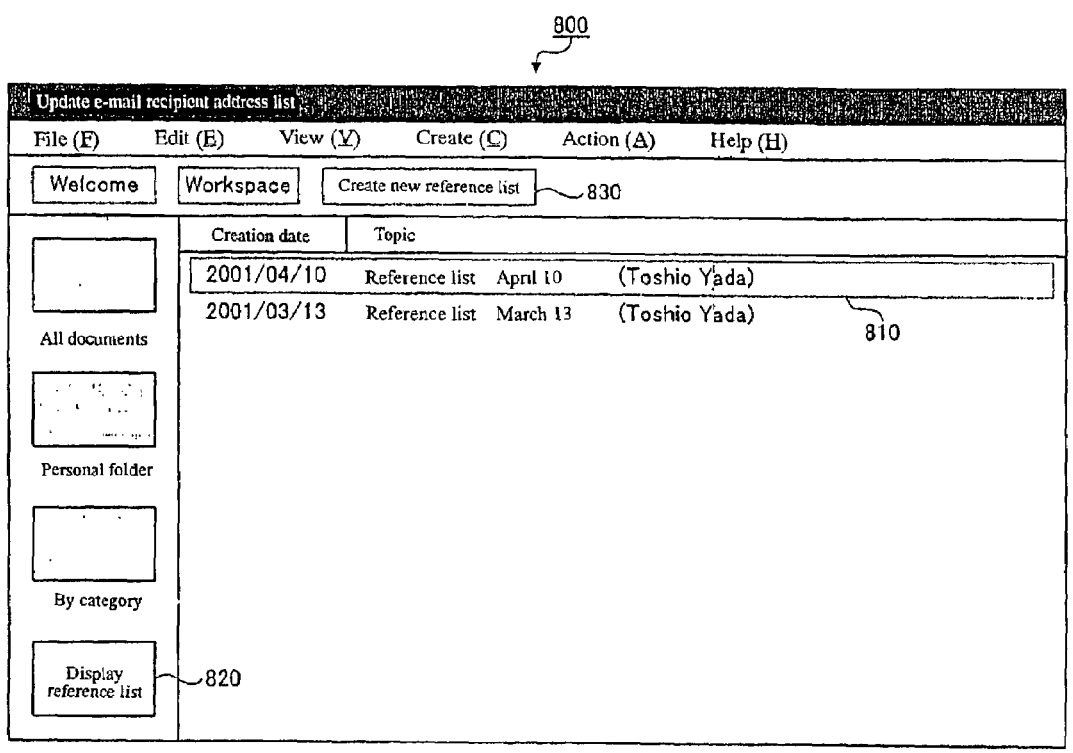
FIG. 8 shows an example of a screen for indicating an update of the reference list according to the embodiment.

After the reference list is newly edited on the reference list editor terminal 200 by following the procedure described earlier, a responsible person terminal 300 accesses the server 100 to activate application software to open the reference list recorded/stored in the database 140 of the server 100, an item topic 810 is displayed on the screen 800 of the application software, as shown in FIG. 8. From this item 810, it can be known that the reference list has been updated.

A display reference list button 820 is provided on the screen 800 of the application software. Various other contents than those shown in FIG. 8 can be displayed on the screen 800 of the application software. The screen containing the item 810 indicating the update of the reference list as shown in FIG. 8 can be displayed by clicking on the reference list display button 820 while another content is displayed.

A create new reference list button 830 is also provided on the application software screen 800. A new reference list can be generated on the reference list creation screen 600 described with reference to FIG. 6 by clicking on the create new reference list button 830 on the reference list editor terminal 200.

Figure 9:
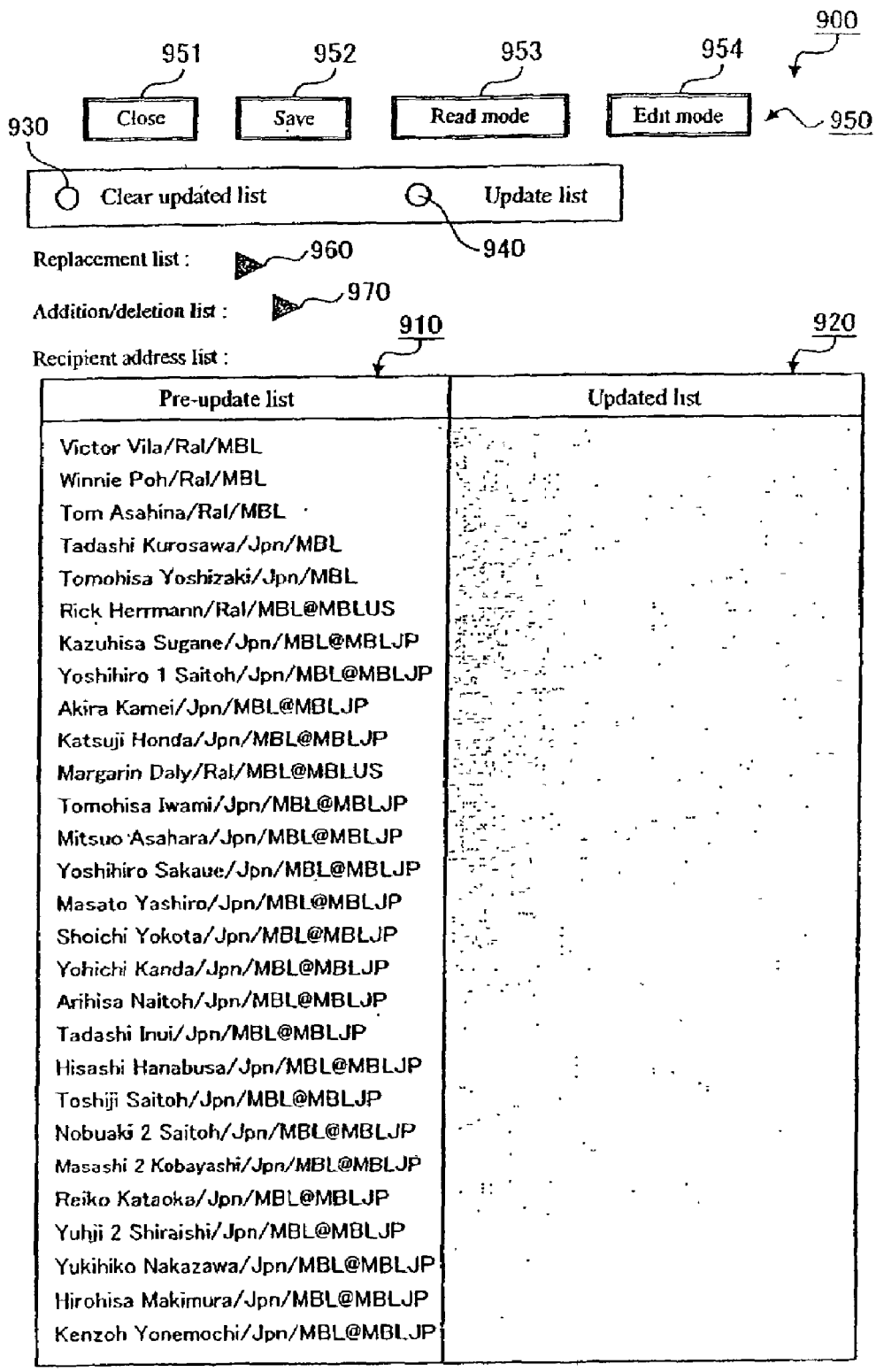
FIG. 9 shows an example of a screen for updating the e-mail recipient address list according to the embodiment.
Figure 10:
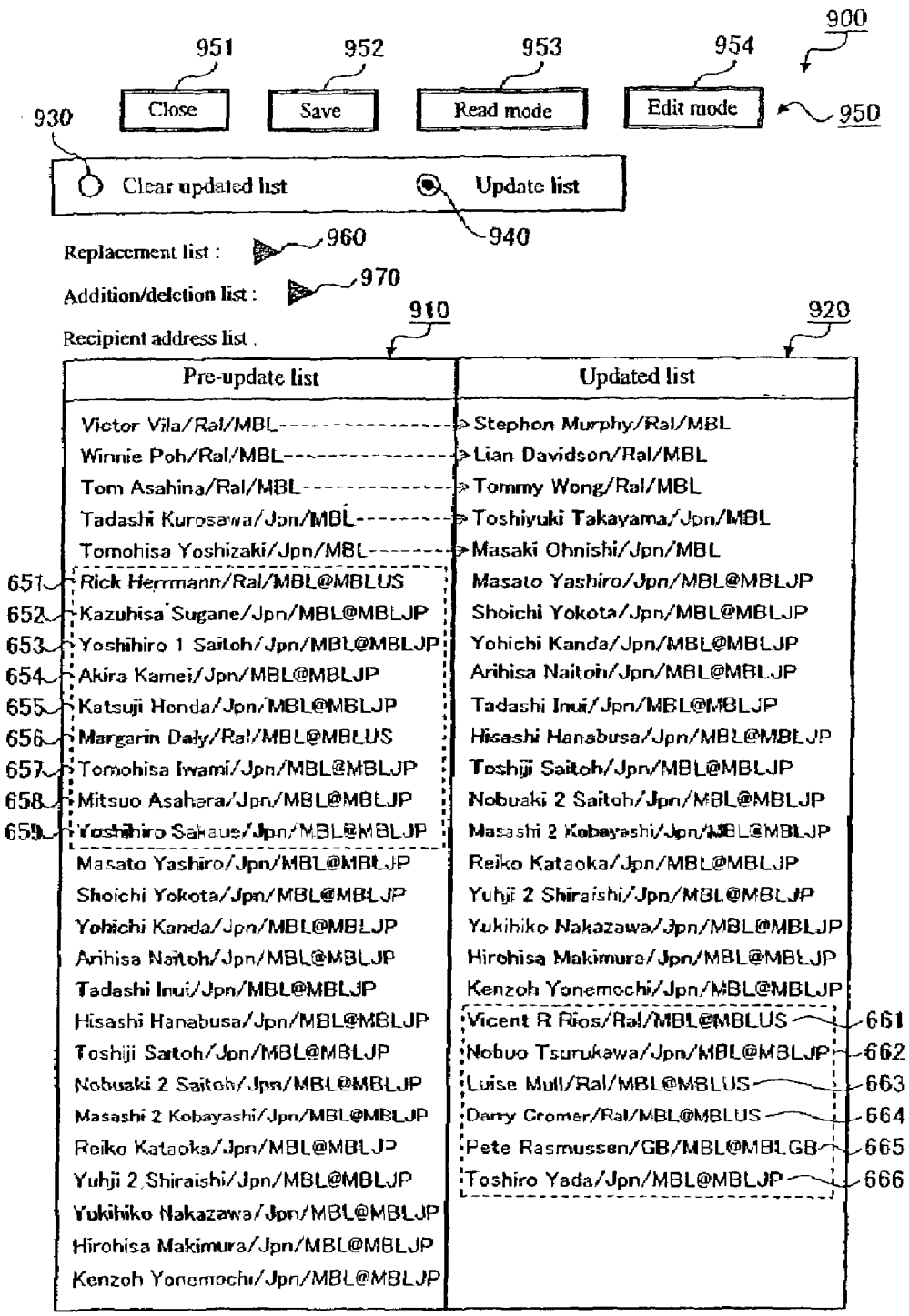
FIG. 10 shows an example of a screen containing an updated e-mail recipient address list; and, FIG. 11 shows an exemplary section of an e-mail screen according to the embodiment.

An e-mail recipient address list update screen 900 shown in FIG. 9 is displayed by clicking the "Update recipient address list" button 674 after the database 140 of the server 100 is accessed from a responsible person terminal 300 and the reference list shown in FIG. 6 is opened.

The e-mail recipient address list update screen 900 consists of a pre-update list section 910, updated list section 920, and a set of buttons 950 including a clear updated list button 930, update list button 940, "Close" button 951, "Save" button 952, "Read mode" button 953, and "Edit mode" button 954.

The "Close" button 951 is a button for closing the e-mail recipient address list update screen 900. The "Save" button 952 is a button for saving all the contents displayed on the e-mail recipient address list update screen 900 as well as an updated e-mail recipient address list. The "Read mode" button 953 is a button for placing the e-mail recipient address list update screen 900 in read mode. The "Edit mode" button 954 is a button for placing the e-mail recipient address list update screen 900 in edit mode.

Also provided in the e-mail recipient address list update screen 900 are a replacement list 960 reflecting the content of the replacement list 610 shown in FIG. 6 and an addition/deletion list 970 reflecting the content of the addition/deletion list 640. Each list created on the reference list creation screen 600 can be displayed by clicking on each of the buttons for these lists. A private reference list for each responsible person can be generated by clicking on the "Edit mode" button 954 to enter an editable state and editing these list on the responsible person terminal 300.

Figure 4:
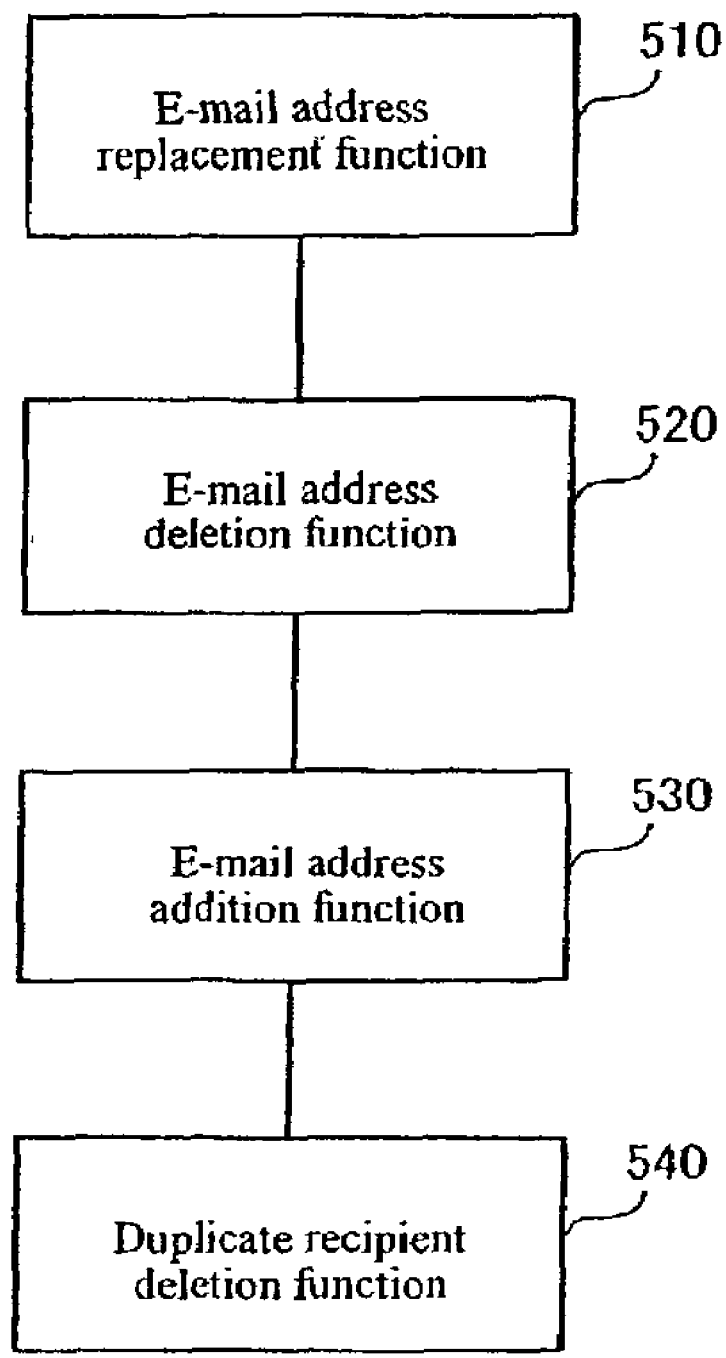
FIG. 4 shows a block diagram of the function of updating the e-mail recipient address list according to the embodiment.

The e-mail recipient address list update screen 900 is operated by following the function blocks shown in FIG. 4. First, e-mail addresses in the pre-replacement list section 620 shown in FIG. 6 are replaced with e-mail addresses entered in the post-replacement list section 630 by the e-mail recipient list replacement function 510. Then, e-mail addresses contained in the deletion list section 650 are deleted from the recipient address list by the e-mail recipient list deletion function 520. E-mail addresses contained in the addition list section 660 are appended to the recipient address list by the e-mail recipient list addition function 530. Duplicate e-mail addresses in the recipient address list are deleted by the duplicate recipient address deletion function 540 to update the e-mail recipient address list, resulting in a new e-mail recipient address list.

If the e-mail recipient address list update screen 900 is not in edit mode, the "Edit mode" button 954 is clicked to enter edit mode. Here, if the updated list section 920 is not blank, the clear updated list button 930 is clicked to clear the updated list section 920. Then the recipient address list to be updated, which is copied to the clipboard, is pasted to the pre-update list 910. In this way, the e-mail recipient address list 331 recorded/stored in the responsible person terminal 300 can be placed in the e-mail recipient address list update screen 900 without fail.

The update list button 940 may then be clicked. The screen appearing after the update list button 940 is clicked is shown in FIG. 10. As shown in FIG. 10, the new recipient address list resulting from the update by the e-mail recipient address list updating function is on the updated list section 920 when the update list button 940 is clicked.

Comparing the e-mail recipient address list displayed on the pre-update list section 910 with the e-mail address list displayed on the updated list section 920, e-mail addresses on the replacement list 610 shown in FIG. 6 are replaced as indicated by dashed arrows. In addition, e-mail addresses 651–659 contained in the deletion list section 650 are deleted from the e-mail address list on die updated list section 920. Furthermore, e-mail addresses 661–666 are appended to the updated list section 920.

In this way, the e-mail recipient address list 331 can be updated simply by accessing the server 100, pasting the e-mail recipient address list 331, and clicking the update list button 940 on the responsible person terminal 300.

After the recipient address list displayed on the updated list section 920 is saved by clicking the "Save" button 952, the "Read mode" button 953 is clicked to enter read mode. Then, the new e-mail recipient address list generated on the updated list section 920 is selected to copy it to the clipboard. In this way, the copied new e-mail recipient address list can be pasted to the e-mail recipient address list field 710 in the section 700 of the e-mail screen shown in FIG. 7.

As shown in FIG. 11, the section 700 of the e-mail screen on the responsible person terminal 300 consists of an e-mail recipient address list field 710, a sender field 720, and a subject field 730, like the section 700 shown in FIG. 7.

The new e-mail recipient address list copied from the updated list section 920 to the clipboard can be pasted to the e-mail recipient address list field 710, thereby providing a new e-mail recipient address list 331'. The pasted new e-mail recipient address list 331' can be stored on the responsible person terminal 300. IN this way, modifications to the e-mail recipient address list are performed by the functions of the server without performing any manual modifications on the responsible person terminal in this embodiment, therefore cumbersome modification tasks are eliminated and manual input errors can be avoided.

Thus, according to the present embodiment, the e-mail recipient address list 331 recorded/stored in the storage device 330 of the responsible person terminal 300 can be updated based on the reference list recorded/stored in the database 140 of the server 100.

Because the e-mail recipient address list 331 is updated by the program or tool described above without any manual operations, information about a personnel change sent from the reference list editor terminal 200 to the responsible person terminal 300 will not be missed. In addition, if the information about the personnel change has not been sent from the reference list editor terminal 200 to the responsible person terminal 300, the responsible person terminal 300 can access the database 140 of the server 100 to reference the information about the personnel change and update the e-mail recipient address list, thereby avoiding the omission of recipient address list updates.

The updating of the e-mail recipient address list may be automatically performed without the need for accessing the database 140 of the server 100 from the responsible person terminal 300.

While the present embodiment has been described in which the reference list recorded/stored in the database 140 of the server 100 is edited from the reference list editor terminal 200 and the e-mail recipient address list 331 recorded/stored in the storage device 330 of the responsible person terminal 300 based on the edited reference list, these functions may be implemented in other forms.

For example, the reference list may be recorded/stored anywhere as long as it can be edited through a network 400. It may be recorded/stored in a local computer.

Furthermore, it is not necessarily required that the server 100 and the reference list editor terminal 200 are implemented by separated computers. The e-mail recipient address list 331 may be recorded/stored anywhere as long as it can be referenced through the network 400. The recipient address list 331 can be updated based on the reference list even if it is recorded/stored on the server 100.

It is not necessarily required that the program or toot implementing the present embodiment runs on the sewer 100. The reference list may be referenced to update the e-mail recipient address list 331 by using a program or tool running on another computer.

The e-mail recipient address list updating described above is not limited to application software, but it can be applied to updating a recipient address list for e-mail broadcasted on the Web. An up-to-date recipient address list can be generated by managing differences between the recipient address list before an update and the updated recipient address list are managed and updating the present recipient address list based on a list of differences.

For example, if a reference list and an executable file based on the reference list are provided on the server, an e-mail recipient address list on a client machine can be specified, updated and downloaded by using a Java applet.

The present embodiment is not limited to a broadcast within an organization. It can be applied to the management of addresses on a mailing list for sending e-mail to the general public. The present embodiment can be applied also for managing addresses of a facsimile as well as e-mail.

The invention claimed is:

1. An e-mail system, comprising:
    an e-mail transmitter having a recipient address list comprising a plurality of recipient addresses, enabling said e-mail transmitter to send at least one e-mail message to all of said recipient addresses using said recipient address list, and sending said recipient address list to a centralized server for updating thereof, using a first network connection therebetween;
    a terminal for editing a reference list comprising a plurality of recipient addresses to be updated among said plurality of recipient addresses on said recipient address list and sending said edited reference list to said centralized server, using a second network connection therebetween; and said centralized server for performing said update of said plurality of recipient addresses on said recipient address list by referencing said edited reference list, after said centralized server receives said recipient address list from said e-mail transmitter and said edited reference list from said terminal, and for providing said updated recipient address list to said e-mail transmitter using said first network connection, thereby enabling said e-mail transmitter to subsequently use said updated recipient address list for sending said at least one e-mail message to all of said recipient addresses on said updated recipient address list, wherein said e-mail transmitter, said terminal, and said centralized sever are distinct from one another.

2. The e-mail system according to claim 1, wherein said centralized server performing said update responsive to receiving said sent recipient address list from said e-mail transmitter.

3. The e-mail system according to claim 1, wherein said reference list contains at least one new recipient address to replace at least one of said plurality of recipient addresses on said recipient address list.

4. The e-mail system according to claim 1, wherein said reference list contains at least one recipient address to be deleted from among said plurality of recipient addresses on said recipient address list.

5. The e-mail system according to claim 1, wherein said reference list contains at least one recipient address to be added to said plurality of recipient addresses on said recipient address list.

6. The e-mail system according to claim 1, wherein said centralized server performs said update responsive to receiving said sent edited reference list from said terminal.

7. The e-mail system according to claim 1, wherein said sending of said recipient address list by said e-mail transmitter is triggered by receiving, at said c-mail transmitter, notification of said editing of reference list.

8. A method of updating a recipient address list comprising a plurality of addresses to which information is sent comprising steps of:
   obtaining by a centralized server from an information sender, a first recipient address list usable by the information sender for sending information:
   obtaining, at the centralized server from a difference list generator, a difference list comprising a plurality of differences between the first recipient address list before an update and a second recipient address list after the update, wherein said first recipient address list and said second recipient address list both comprise a plurality of recipient addresses;
   updating said first recipient address list, at the centralized server, by referencing said difference list, thereby creating said second recipient address list; and
   providing, by the centralized server, said second recipient address list to said information sender, thereby enabling said information sender to automatically use said second recipient address list for sending information to all of said recipient addresses on said second recipient address list,
   wherein said difference list generator, said centralized server, and said information sender are distinct foam one another.

9. The recipient address list updating method according to claim 8, wherein said updating of said first recipient address list is performed on a regular basis.

10. The recipient address list updating method according to claim 8, wherein said updating of said first recipient address list is performed in response to an indication of generation of said difference list.

11. The recipient address list updating method according to claim 8, wherein said plurality of differences comprising said difference list includes a plurality of (i) an address to be replaced in, (ii) an address to be deleted from, and (iii) an address to be added to, the plurality of addresses contained in said first recipient address list and said step of updating said first recipient address list comprises replacing each address to be replaced, deleting each address to be deleted, and adding each address to be added.

12. The recipient address list updating method according to claim 7, further comprising the step of editing said difference list, by said difference list generator, and wherein said step of updating said first recipient address list further comprises updating said first recipient address list by referencing said edited difference list.

13. The method according to claim 8, wherein said recipient addresses are facsimile addresses.

14. A computer apparatus for updating a recipient address list containing a plurality of recipient addresses to which given information is sent, comprising:
   a recipient address list storage, at each of at least one information senders, for storing a recipient address list comprising a plurality of recipient addresses to which give information is sent;
   a reference list storage for storing, for a reference list generator, a reference list comprising a plurality of update for said recipient addresses in said recipient address lists, said plurality of updates comprising a plurality of(i) a address to be replaced in said recipient address lists and a different recipient address to be used therefor, (ii) a address to be deleted from said recipient address list, and (iii) a new recipient address to be added to said recipient address lists; and
   a centralized server, comprising:
      a replacement module for replacing, in said recipient address lists by referencing said stored reference list, each recipient address to be replaced with said different recipient address to be used therefor;
      a deletion module for deleting, from said recipient address lists by referencing said stored reference list, each recipient address to be deleted;
      an addition module for adding, to said recipient address lists by referencing said stored reference list, each new recipient address to be added ; and
      a module for providing said recipient address lists, after operation of one or more of said replacement module, said deletion module, and said addition module, to said at least one information senders, thereby enabling said at least one or more information senders to automatically use said provided recipient address list for sending said given information,
   wherein said information senders, said reference list generator, and said centralized server are distinct from one another.

15. The computer apparatus according to claim 14, wherein said reference list storage stores said reference list in response to creation thereof by said reference list generator.

16. The computer apparatus according to claim 14, wherein said centralized server further comprises an input module for obtaining said recipient address lists, prior to operation of said replacement module, said deletion module, and said addition module, from said at least one information senders.

17. The computer apparatus according to claim 14, wherein said recipient addresses are facsimile addresses.

18. The computer apparatus according to claim 14, wherein said recipient addresses are e-mail addresses.

19. An e-mail system, comprising:
- a plurality of e-mail transmitters, each having a corresponding recipient address list comprising a plurality of recipient addresses, each of said e-mail transmitters enabled to use said corresponding recipient address list to send at least one e-mail message to all of said recipient addresses, and each of said c-mail transmitters sending said corresponding recipient address list to a centralized server for updating thereof;, using first network connections therebetween
- a terminal for editing a reference list comprising a plurality of recipient addresses to be updated among said plurality of recipient addresses on each of said recipient address lists and sending said edited reference list to said centralized server, using a second network connection therebetween; and
- said centralized server for performing said update of said plurality of recipient addresses on at least one of said recipient address lists by referencing said edited reference list, after said centralized server receives said recipient address lists from at least one sending one of said e-mail transmitters and said edited reference list from said terminal, thereby creating an updated version of each of said recipient address lists from said sending e-mail transmitters, and for providing, to each of said sending e-mail transmitters, said corresponding updated version using said first network connections, thereby enabling each of said sending e-mail transmitters to subsequently use said corresponding updated version of said recipient address list for sending said at least one e-mail message to all of said recipient addresses on said corresponding updated version of said recipient address list, wherein said e-mail transmitters, said terminal, and said centralized server arc distinct from one another.

* * * * *

UNITED STATES PATENT AND TRADEMARK OFFICE
CERTIFICATE OF CORRECTION

| | |
|---|---|
| PATENT NO. | : 7,092,994 B2 |
| APPLICATION NO. | : 10/064793 |
| DATED | : August 15, 2006 |
| INVENTOR(S) | : Nishio et al. |

It is certified that error appears in the above-identified patent and that said Letters Patent is hereby corrected as shown below:

<u>Column 5,</u>
Line 15, change "addressees replacing" to -- addresses replacing --;

<u>Column 12,</u>
Line 58, change "list on" to -- lists on --;

<u>Column 15,</u>
Line 16, change "server performing" to -- server performs --;
Line 33, change "sent edited reference" to -- sent reference --;
Line 36, change "said c-mail" to -- said e-mail --;
Line 41, Change "obtaining by" to -- obtaining, by --;
Line 61, change "distinct foam" to -- distinct from --;

<u>Column 16,</u>
Line 13, change "claim 7" to -- claim 8 --;
Line 29, change "update for" to -- updates for --;
Line 31, change "plurality of(i) a address" to -- plurality of (i) a recipient address --;
Line 33, change "a address" to -- a recipient address --;
Line 34, change "address list" to -- address lists --;
Line 52, change "one or more information" to -- one information --;
Line 54, change "address list" to -- address lists --;

<u>Column 17,</u>
Line 11, change "said c-mail" to-- said e-mail --;
Line 13, change "thereof:, using" to -- thereof, using --.
Line 14, change "therebetween" to -- therebetween; --

UNITED STATES PATENT AND TRADEMARK OFFICE
CERTIFICATE OF CORRECTION

PATENT NO. : 7,092,994 B2
APPLICATION NO. : 10/0645793
DATED : August 15, 2006
INVENTOR(S) : Nishio et al.

It is certified that error appears in the above-identified patent and that said Letters Patent is hereby corrected as shown below:

Column 18,
Line 19, change "server arc" to -- server are --.

Signed and Sealed this

Second Day of January, 2007

JON W. DUDAS
*Director of the United States Patent and Trademark Office*